United States Patent [19]

Heydon et al.

[11] Patent Number: 6,081,268
[45] Date of Patent: Jun. 27, 2000

[54] METHOD FOR IGNORING REDUNDANT CONSTRAINTS IN A GRAPHIC EDITOR

[75] Inventors: C. Allan Heydon, San Francisco; C. Gregory Nelson, Palo Alto; Eric H. Veach, Mountain View, all of Calif.

[73] Assignee: Digital Equipment Corporation, Maynard, Mass.

[21] Appl. No.: 08/922,909

[22] Filed: Sep. 3, 1997

[51] Int. Cl.[7] .................................................. G06F 15/00
[52] U.S. Cl. ........................ 345/418; 345/420; 345/433
[58] Field of Search .................................. 345/418, 420, 345/433

[56] References Cited

U.S. PATENT DOCUMENTS

| | | | |
|---|---|---|---|
| 4,999,553 | 3/1991 | Seraji | 318/561 |
| 5,297,057 | 3/1994 | Kramer et al. | 364/512 |
| 5,390,294 | 2/1995 | Takeuchi | 395/155 |
| 5,497,452 | 3/1996 | Shimizu et al. | 345/420 |
| 5,754,181 | 5/1998 | Amdursky et al. | 345/419 |
| 5,784,063 | 7/1998 | Nagakura et al. | 345/420 |

*Primary Examiner*—Mark K. Zimmerman
*Assistant Examiner*—Motilwea Good-Johnson
*Attorney, Agent, or Firm*—Digital Equipment Corporation

[57] ABSTRACT

Using an input device of a computer system, a graphic drawing is defined to include at least one graphic component. The graphic component is subject to a plurality of constraints. At least one of the constraints is redundant with respect to the other constraints. Approximate linear equations are substituted for the constraints. A subset of the equations are selected to determine a converging solution for the redundantly constrained graphic drawing.

11 Claims, 7 Drawing Sheets

METHOD FOR IGNORING REDUNDANT CONSTRAINTS IN A GRAPHIC EDITOR

FIELD OF THE INVENTION

The present invention relates generally to the field of computer aided design systems, and more particularly to graphic editors used with such systems.

BACKGROUND OF THE INVENTION

Engineers and designers use computer aided design (CAD) systems to generate drawings and designs. Using a graphic editor, a user of the system specifies the components of a drawing with input devices such as a keyboard and a mouse. The resulting drawing can be rendered on a display device or a printer for viewing. In some sophisticated systems, the drawings may directly drive a manufacturing process to produce the object depicted in the drawing. The drawing's specifications typically are stored in a memory of the CAD system. The specifications can include the general geometric shape of the drawing's components, and any additional constraints which are to be applied when rendering the drawing.

The constraints allow a user to limit the possible configurations of a drawing while the components are manipulated in real-time. For example, to draw an equilateral triangle with a graphic editor, the user first draws any arbitrary triangle, i.e., three lines connected at their ends. Then, the user constrains the sides of the triangle to be equal. By specifying the constraints, the triangle can be freely manipulated, for example, according to size and orientation, while retaining its correct equilateral shape. Similarly, other geometric shapes can be added, and constraints relating the components can be added to reflect the designer's overall intent.

A constraint solver is typically used to maintain the geometric relationships of the drawing's components according to the user specified constraints. The constraint solver determines values for various component variables used in the constraints so that the geometric relationships of the various components remain consistent, no matter how the components are arranged.

In some cases, the components of the drawing are redundantly constrained by the user. For example, an equilateral triangle is redundantly constrained when the user specifies that all sides need to be equal, and also, that all angles of the triangle need to be equal. This is a trivial case, which is unlikely to happen in practice.

However, in a drawing including many complex geometric components of various shapes and configurations, imagine an aircraft frame, even a skilled user will have great difficulty deducing the absolute minimum number of constraints required to exactly define the desired configuration of the components. Avoiding the specification of redundant constraints may require the burdensome task of proving many obscure theorems in Euclidean geometry. In this case, the conservative, and perhaps lazy user is likely to add unnecessary redundant constraints to the drawing.

In the prior art, redundant constraints have been difficult to solve, and can consume a large amount of processing time, making known graphic editors cumbersome to use. In many cases, the redundant constraints totally confuse the solver, causing it not to find any solution. Therefore, it is desired to provide a graphic editor which can efficiently solve a redundantly constrained drawing.

SUMMARY OF THE INVENTION

Provided is a computerized method for solving a plurality of constraints of a graphic drawing. The constraints can be linear or non-linear. In the method, a set of initial values for a set of variables of equations comprising the constraints are stored in a memory of a computer system. The plurality of constraints are also stored in the memory of the computer system. At least one of the plurality of constraints is redundant with respect to some of the other constraints.

The set of equations is approximated at current values of the set of variables by a linear system of the form $A \cdot x = b$, where A is a matrix, x is a set of "delta" variables, and b is a vector of errors in the linear approximations of the constraints. A well-conditioned subset of rows of the matrix A are selected, and an exact solution for the plurality of selected rows is used to resolve the plurality of constraints of the graphic component.

In one aspect of the invention, the linear form $A \cdot x = b$ is normalized, and a Gaussian elimination is applied to the normalized linear form. The Gaussian elimination uses complete pivoting about diagonal points of the matrix to substantially arrange the diagonal points in a decreasing order.

BRIEF DESCRIPTION OF THE DRAWINGS

The present invention may best be understood from the following detailed description of the embodiments of the invention illustrated in the drawings, wherein.

DETAILED DESCRIPTION OF THE PREFERRED EMBODIMENT

General Configuration

Figure 1:
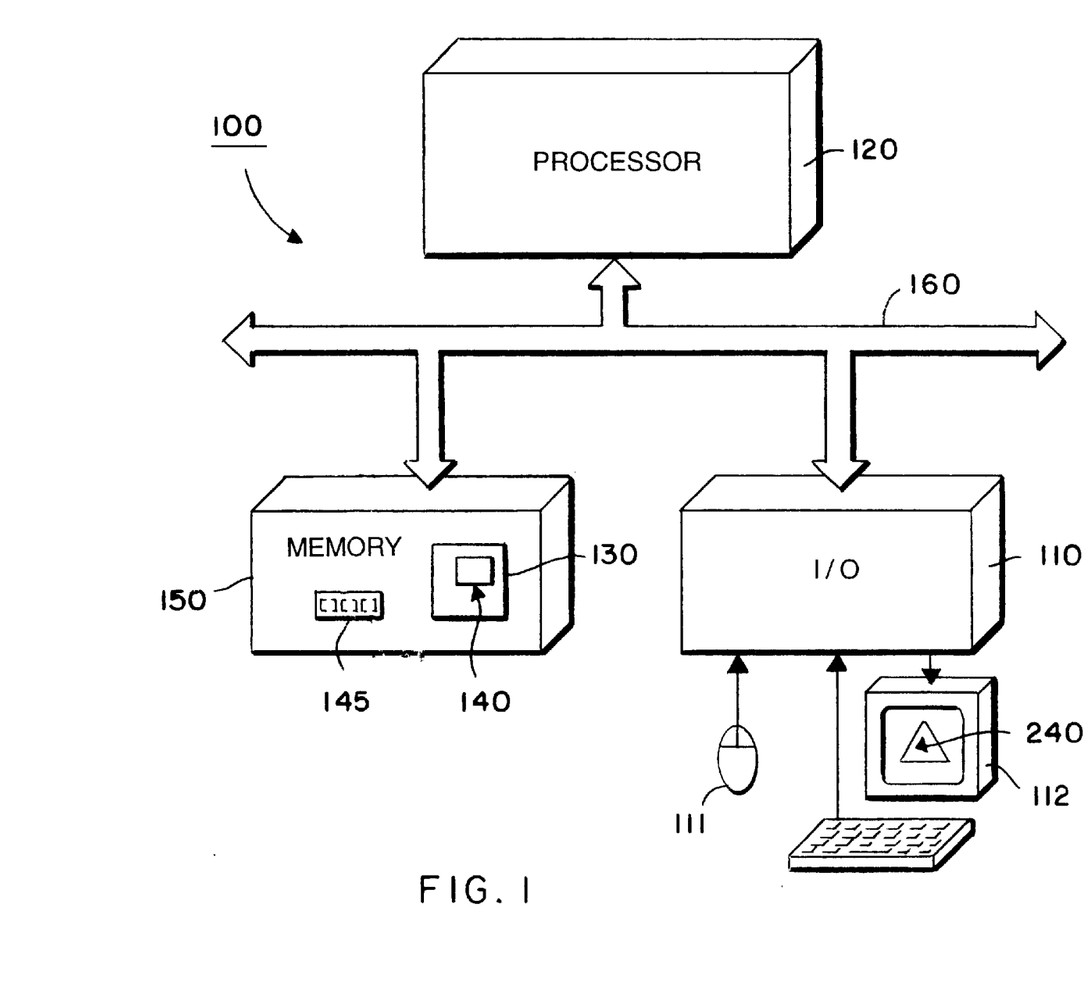
FIG. 1 is a block diagram of a computer system including a constraint solver according to the principles of the invention.

FIG. 1 shows a computer system 100 including a processor 120, a memory 150, and input/output interfaces (I/O) 110 connected to each other by a bus 160. The memory 150 can store data and instructions to operate on the data. The instructions can be organized as software programs, such as a graphic editor 130 having a constraint solver 140 operating according to the principles of the present invention. The I/O 110 can be connected to input/output devices, for example, a mouse 111 and a display terminal 112.

General Operation of System

Figure 2:
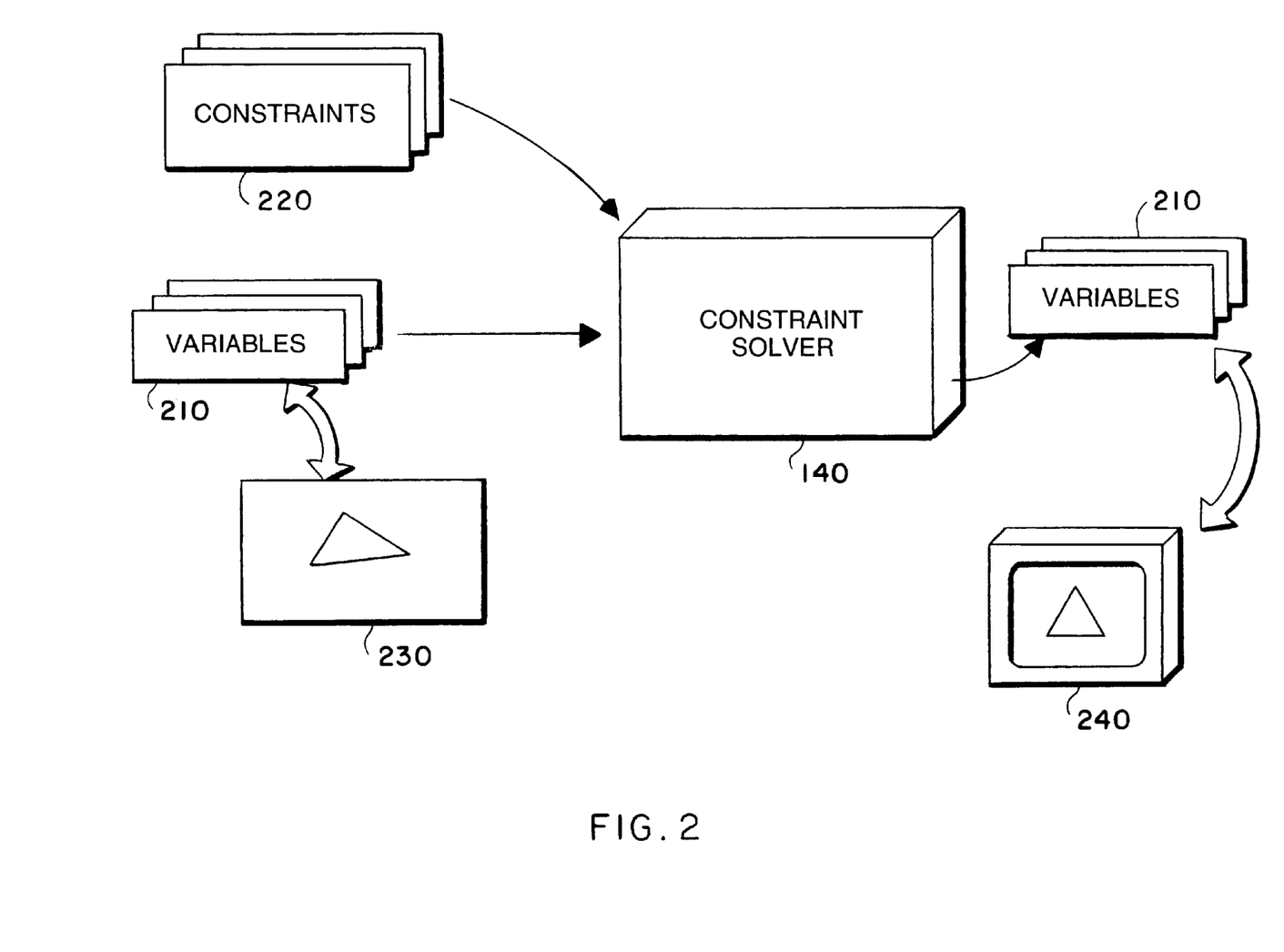
FIG. 2 is a flow diagram illustrating the input and output of the constraint solver of FIG. 1.

During operation of the system 100, a user interactively generates a drawing comprising geometric components, such as a triangle 240, using the input/output devices 111-112. The interaction is facilitated by the graphic editor 130. The specification of the drawing generated by the user is stored in the memory 150 as data 145.

The user may limit the allowable configurations of the drawing by applying constraints to the drawing. Generally, constraints are nothing more than a set of related equations. The equations can be linear and non-linear. Thus, solving the equations is equivalent to finding a correct solution to the user specified constraints for arbitrary arrangements and sizes of the components.

Constraint Solver

FIG. 2 generally shows the operation of the system 100 with respect to the constraint solver 140. The constraint solver 140 takes as input a set of variables 210 and constraints 220. A particular set of values for the variables 210 specify the exact configuration of a geometric component, e.g., a triangle 230. The triangle 230 can be drawn using the mouse 111 of FIG. 1 with the display device 112 providing feed-back. The constraints 220 can be selected from a list of displayed constraints. The constraints 220 can generally be expressed as a set of related equations. The equations may be non-linear. Non-linear equations include, as a special kind, linear equations.

In general, the constraints 220 are a restricted form of predicate from the first-order theory of real numbers with equality, together with the theory of ordered pairs. The constraints 220 may include existential quantification, conjunction, and disjunction, but not universal quantification, or Boolean negation. Atomic formulas used in constraints to determine numeric values may include primitive, predefined, or user-defined predicates or functions (including addition, multiplication, trigonometric, and exponential functions), but not inequalities and integer functions. This general framework is expressive enough to represent any constraint in Euclidean geometry.

Solving the constraints then becomes the problem of determining the numeric values of the variables for a given configuration. As an advantage, the present constraint solver 140 determines the correct values of the variables 210 for various configurations of the drawing, e.g., triangle 240, even when there are redundant constraints.

Newton-Raphson Iteration

The numeric constraints are solved using the well known technique of Newton-Raphson iteration. This method finds roots of simultaneous non-linear equations. This method employs a series of iterations of a basic step. During each iteration, each given non-linear constraint is replaced by a linear constraint that agrees to the first order with the true (non-linear) constraint around the current approximate solution. Each linear constraint is then solved to obtain a next solution that improves upon the previous approximate solution. By repeating the basic step, the approximation is improved to whatever degree of accuracy is required.

Figure 3:
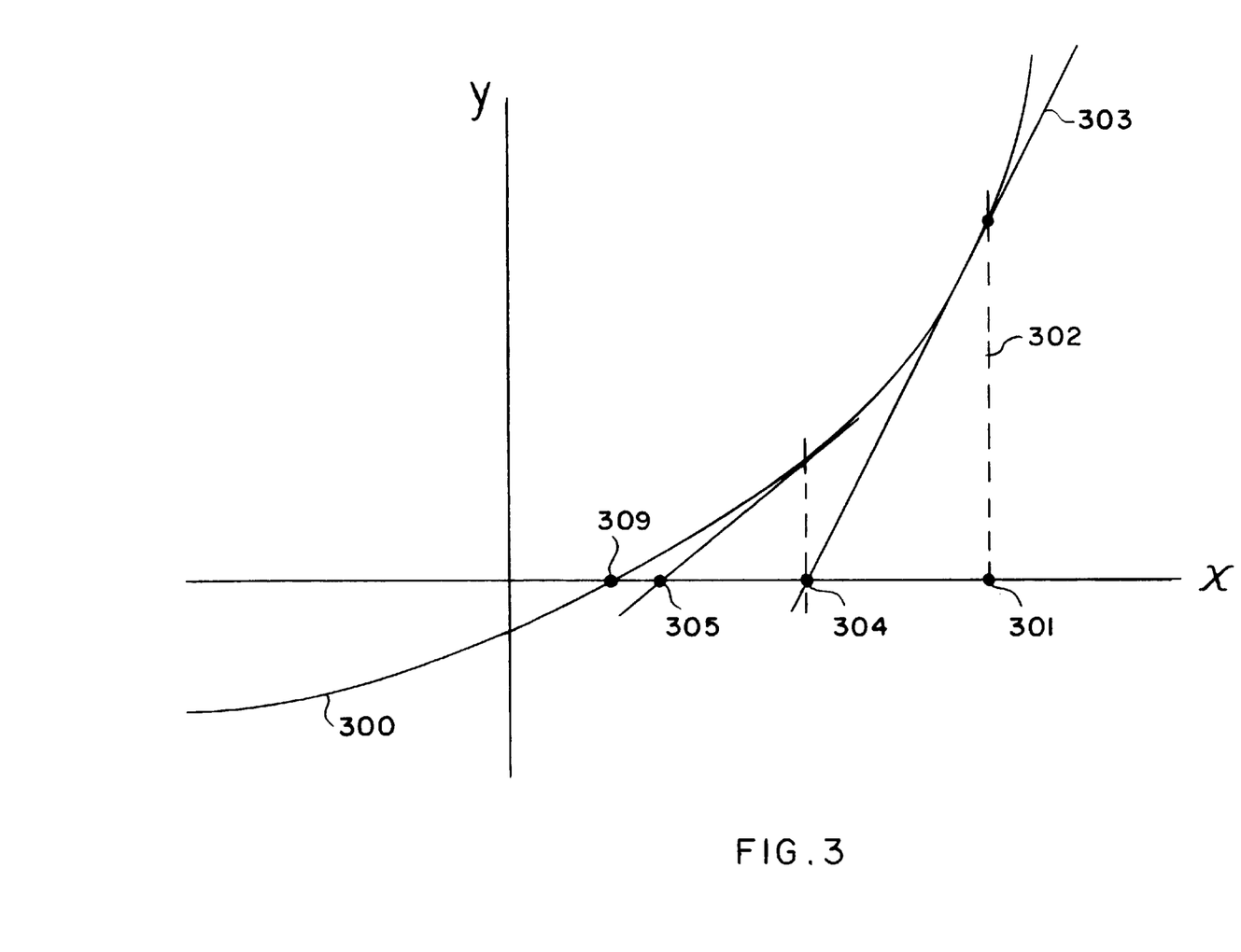
FIG. 3 is a graph generally showing a general approximation method.

FIG. 3 shows the basic idea employed by the Newton-Raphson method. Curve 300 represents a non-linear function "y" of a single variable "x". A solution to the equation is a point 309 where the curve 300 intersects the x-axis, a so called "root" of the equation. Point 301 along the x-axis is a first "guess" at a solution for the equation. In theory, point 301 can be any value on the x-axis. In practice, the initial configuration of the drawing supplied by the user is used as the first "guess" by the solver.

A vertical line 302 is drawn to intersect the curve 300. At point 303, where the vertical line 302 intersects the curve, a tangent is drawn to intersect the x-axis at point 304. Point 304 is used in the next iteration to determine a better approximation 305. These basic steps are repeated until the solution converges. As an advantage, the method converges relatively quickly.

This example illustrates the technique for a single function of a single variable. In general, the solver can find simultaneous roots of multiple functions and multiple variables.

Redundantly Constrained Graphic Component

Figure 4:
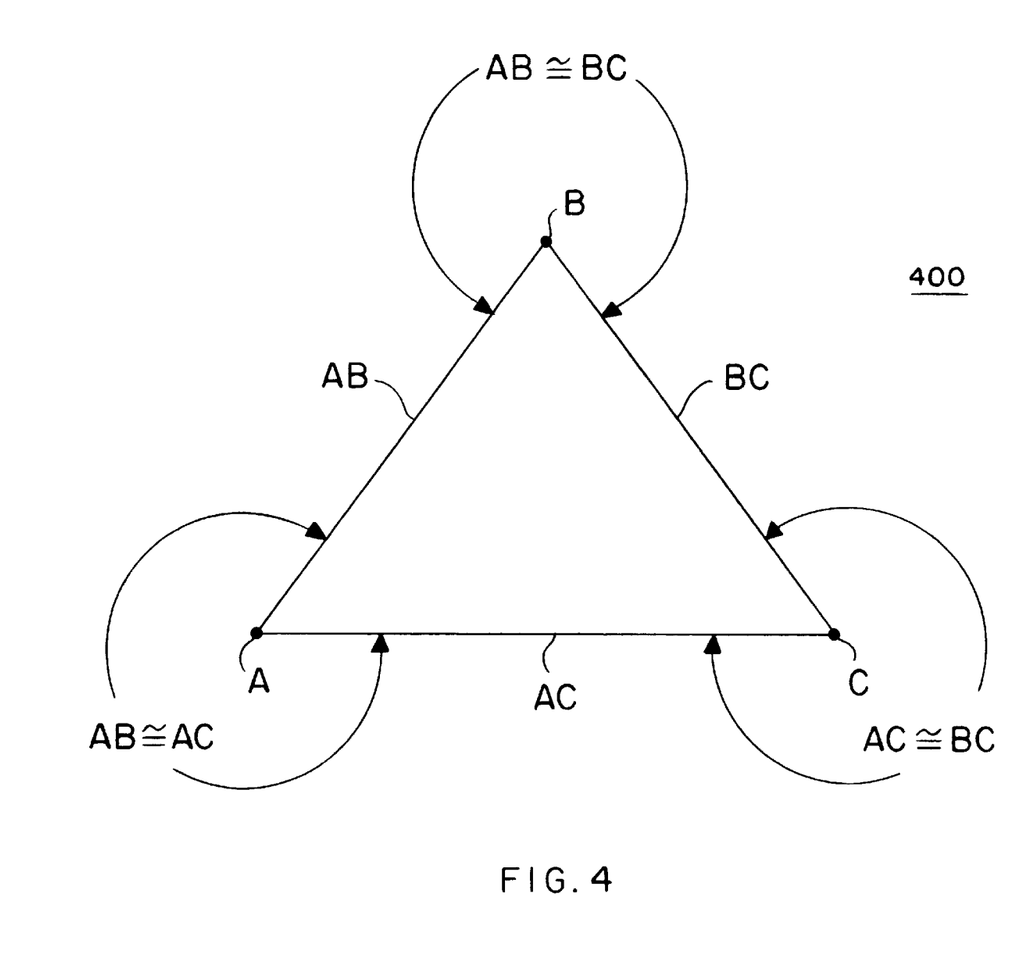
FIG. 4 is a collection of graphic components having a plurality of redundant constraints.

FIG. 4 shows a graphic component of a drawing, for example a triangle 400. The constraints specifying the "shape" of the triangle are:

AB≈BC, AB≈AC, and BC≈AC, that is, the triangle is equilateral. The constraint solver 140 must solve these constraints whenever rendering a particular configuration of the triangle. However, by transitivity, only two of the constraints are necessary; the third is implied by the other two, and hence is redundant.

Generally, to solve the constraints, the solver 140 must determine values for a set of "n" real-valued variables used in a set of "m" equations. When the errors in the constraints at the current solution are relatively small, the constraints are solved.

Generally, it is well known that the Newton-Raphson method will likely fail when the constraints are consistent but redundant. This is true because the linear systems obtained in the basic step from a redundant system are ill-conditioned. Ill-conditioned linear systems cause successive approximations to diverge. Clearly, a correct solution requires convergence.

Modified Newton-Raphson

Accordingly, in the present invention, a basic step of the Newton-Raphson method is modified. In the preferred embodiment, only a subset of selected "well-conditioned" constraints are used in each step, rather than using all constraints, as in the known method. In this way, ill-conditioned parts of the linear system are avoided, and enough of the well-conditioned parts of the linear system are used to successfully converge to a legitimate solution.

The method used by the constraint solver according to the present invention is described in greater detail with reference to FIG. 5. The method begins processing the components of a drawing having an initial configuration "s," more specifically a vector of "n" variables and a set of "m" constraints "C," step 500. The values of the variables determine the initial configuration. The initial configuration of the drawing is stored in the memory 140 as data 145.

The constraint solver takes the initial configuration "s" as a "guess" to arrive at a final solution for the constraints. In step 515, the solver determines if the relative error in the constraints "C" at the current solution is small. If this is the case, then the method terminates in step 520, and the current solution "s" is taken as the final solution. Otherwise, the following steps are repeated until the error in the constraints "C" at the current solution becomes acceptable.

In step 525, the constraint solver approximates the configuration "s" of the components of the drawing as a linear system having the form:

$$A \cdot x = b$$

Figure 6:
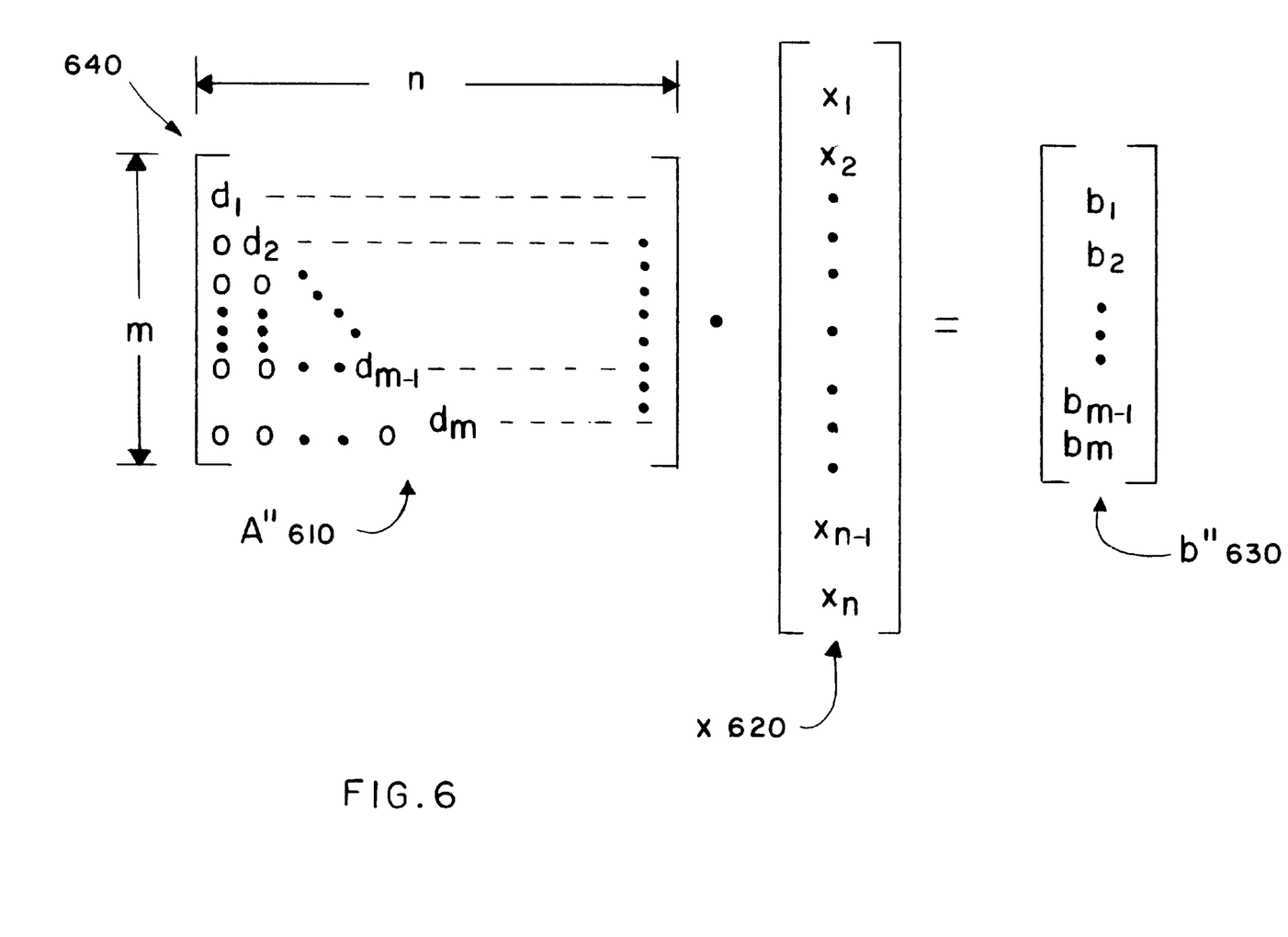
FIG. 6 illustrates a linear form of the constraints.

Here, "A" is a matrix that has exactly "m" rows and "n" columns, "m" and "n" are not necessarily the same size, usually "n" is greater than "m"; see FIG. 6. Each of the "m" rows is an equation of "n" coefficients. The matrix "A" is multiplied by an n-dimensional column vector "x" of "delta" variables. The errors in the constraints at the current solution are expressed by an m-dimensional vector "b." The vector x of "delta" variables is solved for as described in the following sections.

Normalization of Non-linear Constraints

After each constraint has been replaced by an equation that agrees to the first order with the true (linear or non-linear) constraint, each resulting equation is normalized so that the magnitude of its largest coefficient becomes unity, step 530. This normalization can be expressed as:

$$A \cdot x = b \rightarrow A' \cdot x = b'$$

Gaussian Elimination with Complete Pivoting

In step 535, the linear system A'·x=b' is subjected to a standard process known as "Gaussian elimination with complete pivoting." Complete pivoting causes the coefficients along the diagonal of the resulting matrix to be roughly arranged in decreasing order from the top-left to the bottom-right.

Gaussian elimination preserves the meaning of the constraints while zeroing all coefficients below the diagonal. In other words, Gaussian elimination transforms the linear system into an equivalent one in which the matrix A is said to be "upper triangular." The Gaussian elimination with complete pivoting step can be expressed as the transformation:

$$A' \cdot x = b' \rightarrow A'' \cdot x = b''$$

FIG. 6 shows the resulting form including A"610, x620, and b"630. The coefficients $d_a$, $d_2$, ... $d_{m-1}$, $d_m$, called the matrix pivot values, are ordered along the diagonal 640 in roughly decreasing order by the complete pivoting, i.e., pair-wise swapping of rows and columns. All coefficients below the diagonal are set to zero. The upper rows of the rectangular matrix tend to be more useful in finding an optimal solution than the lower rows. This is true because solving the upper well-conditioned rows produces more error-reduction per unit of change in the approximate solution than the lower ill-conditioned rows.

Consequently, the present invention determines a cut-off point "r" in step 540. The details of step 540 are described in greater detail with reference to FIG. 7 below. All rows at and above the cut-off point, i.e,. "well-conditioned rows" are used to find a solution to the constraints, step 545; all rows below the cut-off point are ignored because they are ill-conditioned. The current solution is updated by the n-dimensional vector "x," and the test for termination is redone in step 515, and so forth.

Determining Well-Conditioned Rows

Figure 7:
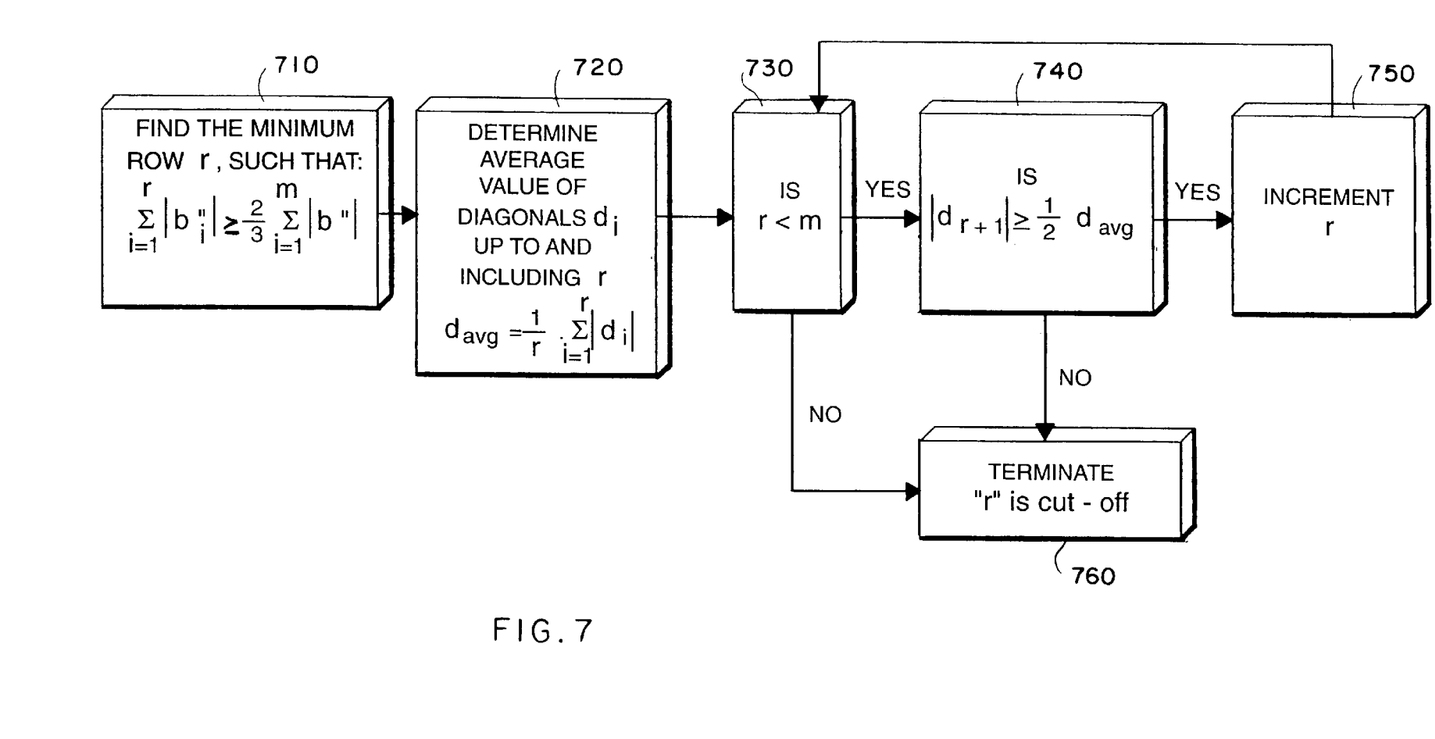
FIG. 7 is a flow graph of the steps to select well-conditioned rows from a set of redundant linear equations to determine a convergent solution.

FIG. 7 is a flow diagram of the steps for determining the cut-off point "r," that is, which part of the matrix will be used in finding a solution to the equations. In step 710, the sums of the prefixes of the absolute values of the error vector b" are considered. The first sum that is at least, for example, two-thirds of the entire column sum is noted, i.e., the invention finds a minimum row "r" such that:

$$\sum_{i=1}^{r} |b_i''| \geq \frac{2}{3} \sum_{i=1}^{m} |b_i''|$$

The cut-off point is low enough to include a sufficient number of rows so that the error contribution of these rows accounts for at least two-thirds of the total error. This guarantees that the error will be reduced by at least a factor of three during each iteration, ignoring the error due to the fact that a linear approximation is used. This guarantees that the method makes progress and will converge.

Increasing Rate of Convergence

In order to increase the rate of convergence, additional rows below the initial cut-off point "r" can be used by moving the cut-off point downwards. The cut-off point is moved downwards as long as the pivot value associated with each additional row has a magnitude that is at least half the average magnitude of the pivot values associated with the rows that are at and above the first noted cut-off point. This admits additional rows as long as the additional rows are not severely ill-conditioned when compared to the well-conditioned rows that are used to make progress towards convergence.

Therefore, in step 720, the average value $d_{avg}$ of the magnitude of the diagonals at and above the initial cut-off row "r" is determined as:

$$d_{avg} = \frac{1}{r} \cdot \sum_{i=1}^{r} |d_i|$$

Then, in step 730, determine if the total number of rows "m" is greater than the current row "r". If this is not true, then terminate in step 760 with row "r" as the cut-off point. Otherwise in step 740, compare the average of the pivot value ($d_{avg}$) with the magnitude of the pivot value in the row just after the current cut-off row as:

$$|d_{r+1}| \geq \frac{1}{2} d_{avg}$$

If the magnitude of the pivot value of the following row (r+1) is less than one half the value of the average pivot value ($d_{avg}$), then the process of selecting the cut-off point terminates in step 760. Otherwise, if the magnitude of the pivot value of the following row is at least half the average pivot value, then move the cut-off point downwards in step 750, i.e. increment "r," and repeat steps 730 through 760 by making the following row the current row, etc. Of course, the threshold values of two-thirds and of one-half may be varied to any number between zero and one as necessary in a particular implementation.

Figure 5:
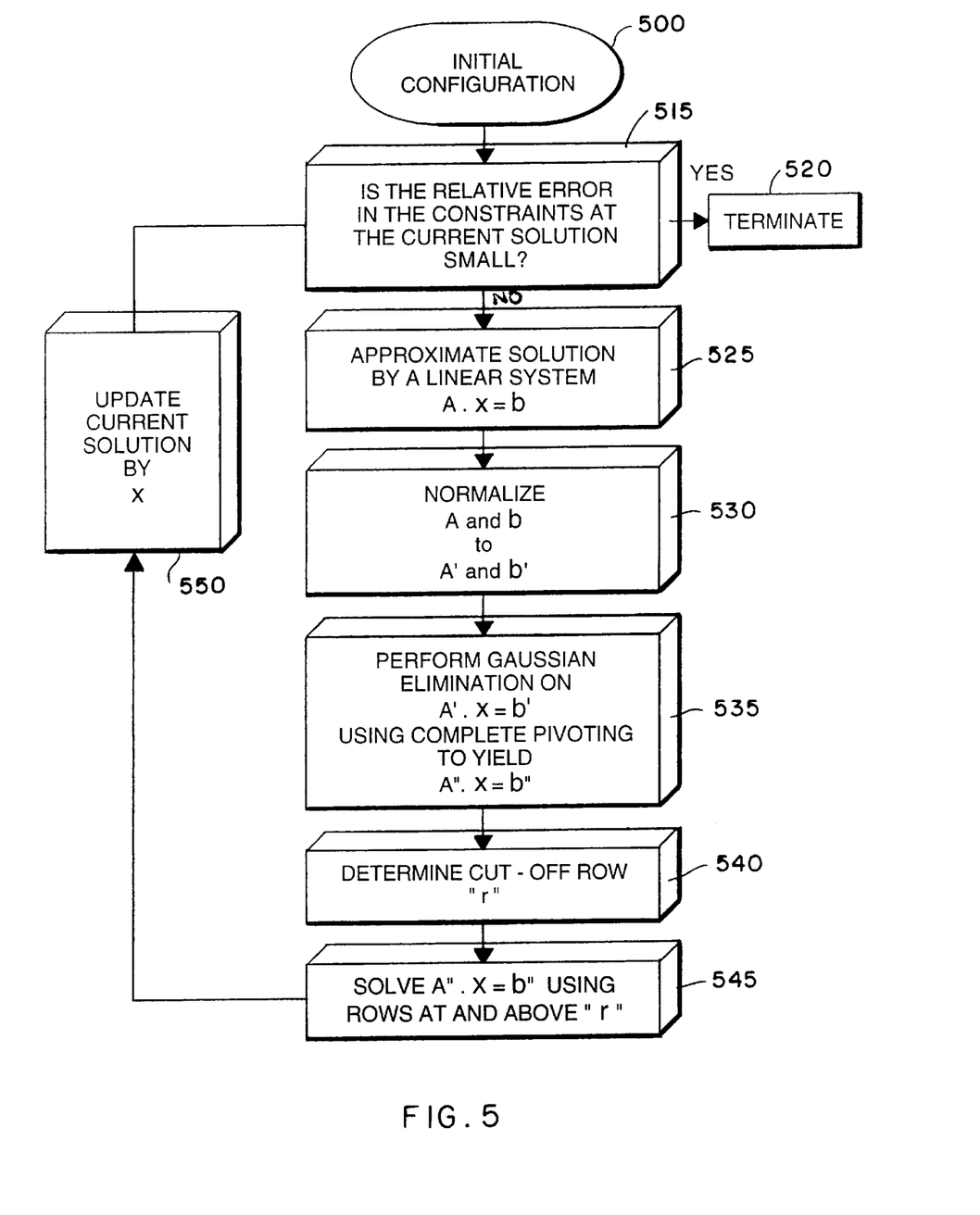
FIG. 5 is flow graph of the steps of the preferred approximation method.

At this point, the solver continues in step 545 of FIG. 5 using the selected rows at and above the cut-off point. After the solution converges, the drawing can be rendered.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computerized method for solving a plurality of constraints of a graphic drawing, comprising the steps of:

storing in a memory of a computer system the plurality of constraints, at least one of the plurality of constraints being redundant, the plurality of constraints being defined by a plurality of equations over a plurality of variables;

storing in the memory a set of values for the plurality of variables to define a configuration of the graphic drawing;

representing the plurality of equations and the plurality of variables as a linear system A·x=b, where A is a matrix of m rows, each row being one of the plurality of equations having n coefficients, x is an n-dimensional vector of delta variables, and b is an m-dimensional vector of the errors in the approximations of the equations for a current solution;

selecting a well-conditioned subset of rows of the matrix A; and determining a solution for the plurality of selected rows to resolve the plurality of constraints to determine the configuration of the graphic drawing.

2. The method of claim 1 wherein the well-conditioned subset of rows include a sufficient number of rows so that the error contribution of the well-conditioned rows account for a predetermined factor of the total error.

3. The method of claim 2 wherein the predetermined factor is greater than or equal to two-thirds.

4. The method of claim 1 wherein each row has an associated pivot point having a pivot value, and wherein additional rows are selected as long as the magnitude of the pivot values of the additional rows is at least a second predetermined factor of the average magnitude of the pivot values of the well-conditioned rows.

5. The method of claim 4 wherein the second predetermined factor is greater than or equal to one half.

6. The method of claim 1 wherein the constraints are linear and non-linear.

7. The method of claim 1 wherein each of the plurality of equations of the linear system is normalized so that a largest coefficient of each equation is one.

8. The method of claim 7 wherein Gaussian elimination is applied to the normalized linear system to make the matrix A upper triangular.

9. The method of claim 8 wherein each row has a pivot point having a pivot value.

10. The method of claim 9 wherein the pivot values of the rows are substantially arranged in a decreasing order.

11. The method of claim 10 wherein a Gaussian elimination uses complete pivoting to arrange the pivot values in the decreasing order.

* * * * *